United States Patent [19]
Williams et al.

[11] Patent Number: 5,938,771
[45] Date of Patent: Aug. 17, 1999

[54] APPARATUS AND METHOD IN A NETWORK INTERFACE FOR ENABLING POWER UP OF A HOST COMPUTER USING MAGIC PACKET AND ON-NOW POWER UP MANAGEMENT SCHEMES

[75] Inventors: Robert Alan Williams, Cupertino; Jeffrey Roy Dwork, San Jose, both of Calif.

[73] Assignee: Advanced Micro Devices, Inc., Sunnyvale, Calif.

[21] Appl. No.: 08/961,432

[22] Filed: Oct. 30, 1997

[51] Int. Cl.[6] ........................................ G06F 1/32
[52] U.S. Cl. ............................. 713/310; 713/323
[58] Field of Search .................. 395/750.01, 750.03, 395/750.05, 750.02, 750.06; 713/300, 310, 320, 323, 324

[56] References Cited

U.S. PATENT DOCUMENTS 5,692,197  11/1997  Narad et al. ............................ 713/323
5,742,833  4/1998  Dea et al. ............................... 713/323
5,802,305  9/1998  McKaughan et al. .................. 709/227
5,835,719  11/1998  Gibson et al. .......................... 709/221

*Primary Examiner*—Glenn A. Auve

[57] ABSTRACT

A network interface for a workstation having multiple power supply domains includes a wake up module for detecting a wake up request in a received data packet according to the on-now power management scheme and Magic Packet™ power management schemes. An EEPROM supplies an override bit to ensure that the on-now power management schemes and Magic Packet™ power up management schemes can have co-existent detection mechanisms, independent of whether a required enable bit is set by the operating system. The disclosed arrangement maintains the power management schemes in the event that a power loss disables the enabled bit normally supplied by the host computer operating system.

13 Claims, 3 Drawing Sheets

APPARATUS AND METHOD IN A NETWORK INTERFACE FOR ENABLING POWER UP OF A HOST COMPUTER USING MAGIC PACKET AND ON-NOW POWER UP MANAGEMENT SCHEMES

BACKGROUND OF THE INVENTION

1. Technical Field

The present invention relates to power supply management in a network workstation, more specifically to power up management arrangements enabling a host computer to be powered up in response to prescribed data packets received by a network interface.

2. Description of the Related Art

Workstation computers are currently being designed to include power saving mechanisms, where the workstation computer will shut itself down after a prescribed interval of activity. The workstation computer is designed to have multiple power supply domains, where a network interface within the workstation will remain in an operative state even though the host computer powers down into a standby state, enabling the network interface to maintain a wake-up routine for the workstation computer.

Specifically, one proposal for a power saving mechanism specifies a wake-up routine for the workstation computer, where a network interface connected to a network such as an Ethernet-type or IEEE 802.3 network maintains sufficient power to receive data packets from a network. For example, one power management scheme developed by Microsoft Corporation, referred to as the "On-Now" Power Management Scheme, enables a network station in a peer-to-peer network to start communication with a destination station, even if the destination station is in a standby condition. According to the On-Now Power Management Scheme, while the rest of the machine is in a low-power state, the network interface in the destination station is monitoring normal network traffic looking for certain classes of frames. When the network interface detects one of these frames, it outputs a signal to initiate CPU operations to control the communications. Additional details related to the "On-Now" power management scheme are described in the Advanced Configuration and Power Interface Specification co-authored by Intel Corporation, Microsoft Corporation, and Toshiba Corporation, dated Dec. 22, 1996 (Rev. 1.0).

An alternative power management scheme is referred to as the Magic Packet™, where the network interface scans incoming data frames for one of two MAC addresses repeated sixteen (16) times within the information field of the frames. Hence, the Magic Packet™ scheme is more simple because the associated logic is only looking for a prescribed pattern within the data packets.

One concern with the existing on-now power management schemes is that the peripheral component interconnect (PCI) specification has been updated to include a PCI power configuration register that includes a power management enable status (PME_STATUS) bit and a PME enable (PME_EN) bit. The PME_STATUS bit indicates a status in detecting a data packet under the on-now power management scheme. The PME_EN bit is a control signal set by the operating system of the host computer. Hence, the PME pin signal is asserted on the PCI bus in response to simultaneous assertion of the PME_STATUS bit and the PME_EN bit.

Hence, the existing power management schemes rely on the operating system to set the PME_EN bit. If power is lost in an on-now system, the CPU needs to be awakened upon return of the power supply in order to reinitialize the on-now power management schemes and the network interface states into a prescribed state. Hence, a substantial problem may exist in legacy systems that do not support OS-directed power management architectures, since the PME_EN bit may come up disabled or enabled following a power loss, requiring a complete reset of the workstation.

SUMMARY OF THE INVENTION

There is a need for an arrangement that Guarantees the activation of power management schemes following a power loss, regardless of the capabilities of the host operating system.

There is also a need for an arrangement that enables co-existence of on-now power management schemes with Magic Packet™ power up management schemes, independent of the capabilities of the host processor or the host operating system architecture.

These and other needs are attained by the present invention, where an enable override circuit causes assertion of a power management enable input in response to a supplied enable override bit from a nonvolatile memory.

According to one aspect of the present invention, an apparatus in a network interface for generating a power management wake up signal to initiate a wake-up routine of a host computer comprises remote wake up logic configured for outputting a wake up request signal in response to detecting a wake up request in a received data packet from a network, and a power management enable circuit configured for selectively asserting the power management wake up signal to the host computer in response to the wake up request signal and a power management enable input supplied from an operating system of the host computer, the power management enable circuit comprising an enable override circuit for causing assertion of the power management enable input in response to a supplied enable override bit and the detected wake up request. Assertion of the power management enable input in response to a supplied enable override bit enables activation of the power up management enable circuit, independent of the status of the host computer or the corresponding host operating system. Hence, the network interface can be automatically configured for power management operation by detecting wake up requests in a received data packet from a network, regardless of the state of the host computer.

Another aspect of the present invention provides a method in a network interface configured for generating a power management wake up signal to initiate a wake-up routine in a host computer, the method comprising detecting a wake up request in a received data packet from a network and generating a corresponding wake up request signal, supplying an enable override bit from a nonvolatile memory to a power management enable circuit in response to a detected power on reset condition, and generating the management wake up signal in the power management enable circuit based on the wake up request signal and one of the enable override bit and a power management enable input from an operating system of the host computer.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein.

BEST MODE FOR CARRYING OUT THE INVENTION

The present invention will be described with the example of a network interface in a packet switched network, such as an Ethernet (IEEE 802.3) network. A description will first be given of a network interface architecture, followed by the arrangement for generating a power management wake up signal to initiate a wake up routine of a host computer. It will become apparent, however, that the present invention is also applicable to other network interface systems.

NETWORK INTERFACE ARCHITECTURE

Figure 1:
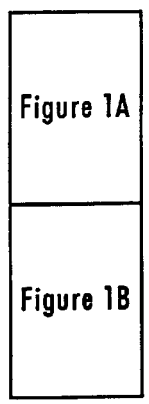
FIG. 1 is a block diagram illustrating an exemplary network interface which may be used for power up management operations independent of the host computer status according to an embodiment of the present invention.

FIG. 1 is a block diagram of an exemplary network interface 10 that accesses the media of an Ethernet (ANSI/IEEE 802.3) network according to an embodiment of the present invention.

The network interface 10, preferably a single-chip, 32-bit Ethernet controller, provides an interface between a local bus 12 of a computer, for example a peripheral component interconnect (PCI) local bus, and an Ethernet based medium 50.

The interface 10 includes a PCI bus interface unit 16, a buffer memory portion 18, and a network interface portion 20. The PCI bus interface unit 16 includes a PCI slave interface 16a and a DMA interface 16b. The slave interface 16a manages PCI control and status information including reading and programming of the PCI status registers, but may also be configured for managing slave transfers via the PCI bus with a host CPU. The DMA interface 16b manages DMA transfers by the network interface 10 to and from system memory. Hence, the PCI bus interface unit 16 can be selectively configured for PCI transfers in slave and/or master (e.g., DMA) mode.

The memory portion 18 includes a 16-bit SRAM implemented directly on the network interface chip 10 for storing transmit data and receive data.

The network interface 10 also includes a buffer management unit 24 configured for managing DMA transfers via the DMA interface 16b. The buffer management unit 24 manages DMA transfers based on DMA descriptors in host memory that specify start address, length, etc. The buffer management unit 24 initiates a DMA read from system memory into the transmit buffer 18b by issuing an instruction to the DMA interface 16b, which translates the instructions into PCI bus cycles. Hence, the buffer management unit 24 contains descriptor management for DMA transfers, as well as pointers associated with storing and reading data from the memory portion 18. Although the buffer management unit 24 and the memory controller 22 are shown as discrete components, the two units may be integrated to form a memory management unit controlling all transfers of data to and from the memory unit 18.

The network interface 20 includes a media access control (MAC) core 26, a general purpose serial interface (GPSI) 28, a media independent interface (MII) 30 for connecting to external 10 Mb/s or 100 Mb/s physical (PHY) transceivers, an external address detection interface (EADI) 32, an attachment unit interface (AUI) 34 having a Manchester encoder and decoder, and a 10/100 Mb/s twisted pair transceiver medium attachment unit (MAU) 36.

The network interface 10 also includes a network port manager 38 configured for performing MII handshaking between two devices on an MII bus via the MII port 30. Such MII handshaking may include link information, programming information at the MII layer using a management data clock (MDC), and management data input/output (MDIO) paths.

The auto-negotiation portion 40 performs IEEE-compliant negotiation with a link partner on the PHY layer to exchange data indicating whether the link partner is capable of operating at 10 Mb/s, 100 Mb/s, and whether the link should be half-duplex or full-duplex.

The LED controller 44 selectively controls the generation of LED output signals based upon the internal decoding logic and network interface status registers (not shown). The network interface 10 also includes an IEEE 1149.1-compliant JTAG boundary scan test access port interface 36.

The EEPROM interface 42 connects to an EEPROM on either a network interface adapter card or the motherboard of the host computer via a serial interface link. The EEPROM (not shown in FIG. 1)) will be programmed with configuration information related to the network interface, enabling the network interface to be configured during initialization via the EEPROM interface 42. Once initialized, the network interface stores the configuration information in internal registers (not shown), enabling the network interface to operate independently of the host computer in the event the host computer is powered down. Hence, the network interface can be configured to operate while the host computer is in a stand-by mode, where a wake up module 52 outputs power up information to logic within the host computer to enable the host computer to automatically turn on in response to data packets received from the network and having a specific protocol, described below.

POWER MANAGEMENT OPERATION

Figure 2:
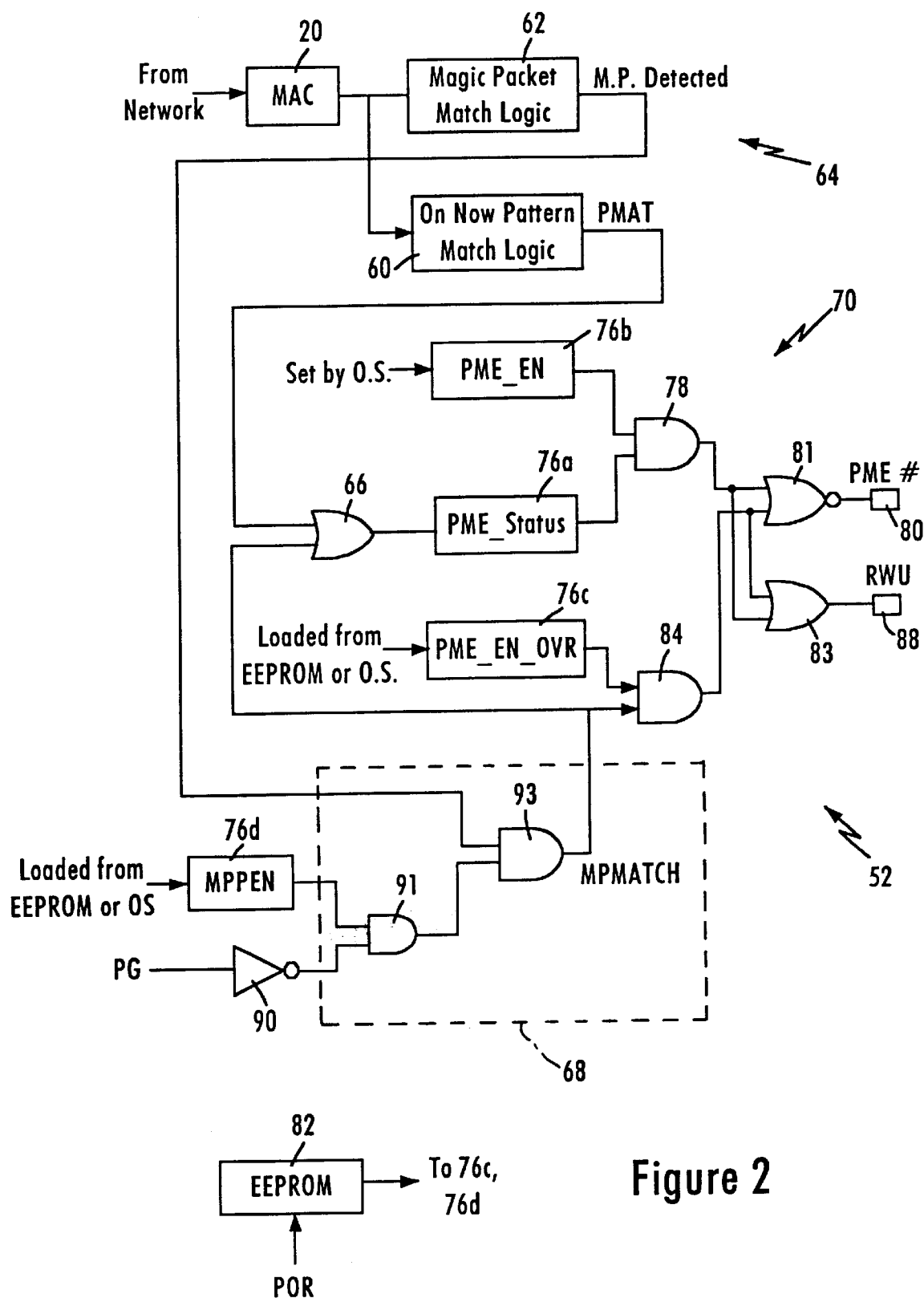
FIG. 2 is a block diagram illustrating an apparatus in the network interface for generating a power management wake up signal for the PCI bus of FIG. 1 according to an embodiment of the present invention.

FIG. 2 is a block diagram of the wake up module 52 in the network interface 10 for generating a power management wake up signal (PME#) to initiate a wake up routine on a host computer according to an embodiment of the present invention.

As shown in FIG. 2, the wake up module 52 includes remote wake up logic 64, including on-now pattern match logic 60 and Magic Packet™ match logic 62 for detecting a wake up request in a received packet from the MAC 20. The on-now pattern match logic 60 and the Magic Packet™ match logic 62 each receive the same received data packet from the MAC 20. The Pattern Match (PMAT) signal output from the on-now pattern match logic 60 is output as a first wake up request to an OR gate 66, which outputs a wake up request signal in response to detecting the wake up request from either the on-now pattern match logic 60 (e.g., PMAT) or the Magic Packet™ wake up logic 68 (e.g., MPMATCH), described below. The wake up request signal specifies a request for hardware external to the network interface 10 to put the host computer into a working mode, also referred to as "S0" mode.

Wake up module 52 also includes a power management enable circuit 70 for selectively asserting the power management wake up signal (PME#) and/or a Remote Wake Up (RWU) to the host computer in response to the wake up request signal from the on-now pattern match logic 60 or from the wake up logic 68. The OR 66 gate outputs a wake up request signal that is stored in a register 76a as a power management enable status (PME_STATUS) bit. The power management enable circuit 70 is configured to receive a power management enable (PME_EN) bit from an operating system that selectively sets the PME enable bit in a register 76b. Assuming the PME_STATUS bit and the PME_EN bit are set in registers 76a and 76b, respectively, the bit values are supplied to an AND gate 78 to cause assertion of the power management wake up signal on the PME# pin 80 to the PCI bus and on a RWU pin 88.

The normal sequence of events in the on-now wake up sequence is that the operating system software typically enables the on-now wake up sequence by setting the PME_EN bit in register 76b. When a wake up event is detected by the on-now pattern match logic 60, the OR gate logic 66 sets the PME_STATUS bit in register 76a, causing the AND gate 78 to output a power management wake up signal to a NOR gate 81 and an OR gate 83 to drive pins 80 and 88, respectively. The registers 76 are bits of a power management control and status register (PMCSR) that is selectively accessible by the host processor, for example by the PCI bus, the EEPROM interface 42, and other devices related to power management. Assertion of the PME# signal on the PCI bus causes external power management hardware to wake up the CPU. The system software then reads the PMCSR register of every PCI device in the system to determine which device asserted the PME# signal. When the software determines that the signal came from the network interface 10, the host system writes to the corresponding PMCSR to put the network interface device 10 into power state D0 (fully operational), and clears the PME_STATUS bit from the register 76a to clear the bit and turn off the PME# signal. In addition, if the wake up was caused by an on-now wake up frame, the contents of the receive buffer 18a and the relevant bits in the interrupt register are preserved so that the network interface driver controlling the network interface 10 can treat the received frame as a normal received frame.

When the network interface 10 is operating in Magic Packet™ mode, the Magic Packet™ logic 62 scans incoming frames for one of two MAC addresses repeated sixteen (16) times within the information field of the frames. When Magic Packet™ detection is enabled, described below, incoming frames from the network are examined for the Magic Packet™ sequence, but the contents of these frames may not be saved.

As described above, the operating system sets the PME_EN bit to enable the on-now wake up sequence. However, a sudden power loss in the host computer may cause the host CPU and the operating system 74 to initialize or turn on an undetermined state, such that the PME_EN bit in register 76b may be disabled or enabled.

In order to overcome this problem, an EEPROM 82 loads a power management enable override bit (PME_EN_OVR) into a register 76c. The power management enable circuit 70 includes an enable override circuit 84 for causing assertion of the power management enable input (PME#) in response to a detected Magic Packet™ in magic packet mode enabled by a nonvolatile memory. Specifically, the EEPROM 82 loads the power management enable override bit into register 76c in response to a power on reset (POR) signal indicating a power on reset condition for the network interface. When power is initially supplied to the workstation (i.e., unswitched power supply), the power on reset (POR) signal is generated within the network interface, causing the network interface to download the EEPROM contents to the associated configuration registers. Once the enable override bit and a Magic Packet™ pin enable (MPPEN) bit is downloaded by the network interface from the EEPROM 82 to registers 76c and 76d, respectively, the PME# signal can be set either by the on-now pattern match logic 60 AND'd with the power management enable (PME_EN) bit received from the operating system 74, or the enable override (PME_EN_OVR) bit received from the EEPROM 82 AND'd with a detected magic packet match (MPMATCH). Since the network interface 10 and the host computer are controlled under different power supply domains, a sudden loss of power to the host computer which may affect the OS 74 will not adversely affect the on-now wake up sequence, since the enable override bit PME_EN_OVR will let the on-now pattern match logic 60 assert PME# even if the system software has not set the PME_EN bit. Moreover, the disclosed arrangement allows maximum flexibility for "Legacy" systems that may not have operating systems with power management capabilities, since the necessary enable (MPPEN) and override (PME_EN_OVR) bits are set from the nonvolatile memory.

The power management enable circuit 84 also includes Magic Packet™ wake up logic 68 for selectively causing assertion of the Magic Packet™ match (MPMATCH) signal. The network interface 10 is configured to enter Magic Packet™ mode in response to receiving a Magic Packet™ pin enable (MPPEN) bit in register 76d from the EEPROM 82 in response to the POR signal. The Magic Packet™ wake up logic 68 also receives a power good (PG) signal from power supply logic in the workstation indicating the power supply to the host computer is at a level to enable the CPU to operate. If the host power supply is terminated, for example due to entering a sleep mode or a loss of power, the power good signal is deasserted, causing the inverter 90 to assert a high signal indicating a detected power down condition in the host computer. The set bit in the MPPEN register 76d and the high signal from the inverter 90 causes the AND gate 91 to output a Magic Packet™ enable signal to the AND gate 93, enabling the AND gate 93 to output a power management wake up signal upon reception of a Magic Packet™ detection signal (MP detected).

Hence, the PME# output pin 80 can be used to indicate that a power management event (e.g., a Magic Packet™, or an on-now pattern match) has been detected. It is asserted when the PME_EN and PME_STATUS bits are both set. If the PME_EN_OVR bit is set, the receipt of a Magic Packet™ can cause the PME# pin 80 to be asserted regardless of the state of the PME_EN bit. The PME# pin 80 is a PCI bus signal that may be driven high or low by any external devices even when no power is supplied to the network interface 10. The assertion of PME# is not inhibited when the power good (PG) signal is low. Moreover, the PME# signal is asynchronous with respect to the PCI clock.

The remote wake up (RWU) pin 88 can drive external system management logic that causes the CPU to get out of a low power mode of operation. The RWU pin 88 is distinct from the PME# pin 80 so that the RWU pin 88 can be connected to external logic that must not be driven when the PCI bus power is off, while the PME# signal can be asserted at any time.

According to the disclosed embodiment, both on-now and Magic Packet™ power management schemes can be used concurrently to generate a power management wake up signal to initiate a wake up routine of a host computer. An enable override bit (PME_EN_OVR) from the EEPROM 82 enables on-now power management to continue, regardless of whether the power management enable (PME_EN) bit is set by the host software 74. In addition, the EEPROM 82 provides a Magic Packet™ pin enable (MPPEN) bit that enables Magic Packet™ mode upon detecting a power down condition in the host computer. Hence, power management schemes can be provided in host computer systems, without the necessity of upgrading operating systems to include power management capabilities.

While this invention has been described in connection with what is presently considered to be the most practical and preferred embodiments, it is to be understood that the invention is not limited to the disclosed embodiments, but, on the contrary, is intended to cover various modifications and equivalent arrangements included within the spirit and scope of the appended claims.

What is claimed is:

1. An apparatus in a network interface for generating a power management wake up signal to initiate a wake-up routine of a host computer, comprising:

remote wake up logic configured for outputting a wake up request signal in response to detecting a wake up request in a received data packet from a network; and a power management enable circuit configured for selectively asserting the power management wake up signal to the host computer in response to the wake up request signal and a power management enable input supplied from an operating system of the host computer, the power management enable circuit comprising an enable override circuit for causing assertion of the power management enable input in response to a supplied enable override bit and the detected wake up request.

2. The apparatus of claim 1, further comprising a nonvolatile memory interface configured for obtaining the enable override bit from a nonvolatile memory in response to a detected power-on reset condition for the apparatus.

3. The apparatus of claim 2, wherein the remote wake up logic comprises host computer wake up logic for selectively causing assertion of the wake up request based on a detected power down condition in the host computer.

4. The apparatus of claim 3, wherein the remote wake up logic outputs a wake up enable signal to an AND gate in response to the detected power down condition of the host computer and a wake up packet enable bit obtained from the nonvolatile memory in response to the detected power on reset condition.

5. The apparatus of claim 1, wherein the enable override circuit comprises wake up logic for selectively causing assertion of the power management enable input in response to a detected power down condition in the host computer.

6. The apparatus of claim 5, wherein the wake up logic causes assertion of the power management enable input in response to the detected power down condition of the host computer and a wake up packet enable bit supplied from a nonvolatile memory in response to the detected power on reset condition.

7. The apparatus of claim 1, wherein the power management enable circuit outputs the power management wake up signal onto a Peripheral Component Interconnect (PCI) bus for response by the host computer.

8. A method in a network interface configured for generating a power management wake up signal to initiate a wake-up routine in a host computer, the method comprising:

detecting a wake up request in a received data packet from a network and generating a corresponding wake up request signal;

supplying an enable override bit from a nonvolatile memory to a power management enable circuit in response to a detected power on reset condition; and generating the management wake up signal in the power management enable circuit based on the wake up request signal and one of the enable override bit and a power management enable input from an operating system of the host computer.

9. The method of claim 8, wherein the detecting step comprises detecting one of a magic packet and an on-now pattern in the received data packet.

10. The method of claim 8, wherein the detecting step comprises detecting a magic packet in the received data packet.

11. The method of claim 10, further comprising selectively supplying a magic packet enable signal to the power management enable circuit in response to a detected power down condition of the host computer, the generating step comprising generating the management wake up signal by the power management enable circuit in response to detection of the magic packet and the reception of the magic packet enable signal.

12. The method of claim 11, wherein the step of selectively supplying a magic packet enable signal comprises supplying a magic packet enable bit from the nonvolatile memory in response to the detected power on reset condition for the network interface.

13. The method of claim 8, wherein the generating step comprises outputting the management wake up signal on a Peripheral Component Interconnect (PCI) bus for response by the host computer.

* * * * *

UNITED STATES PATENT AND TRADEMARK OFFICE
CERTIFICATE OF CORRECTION

PATENT NO. : 5,938,771

DATED : August 17, 1999

INVENTOR(S) : Robert Alan Williams, et al

It is certified that error appears in the above-identified patent and that said Letters Patent is hereby corrected as shown below:

On the title page, Item [75], add --Ching Yu-- as co-inventor.

Figure 1A:
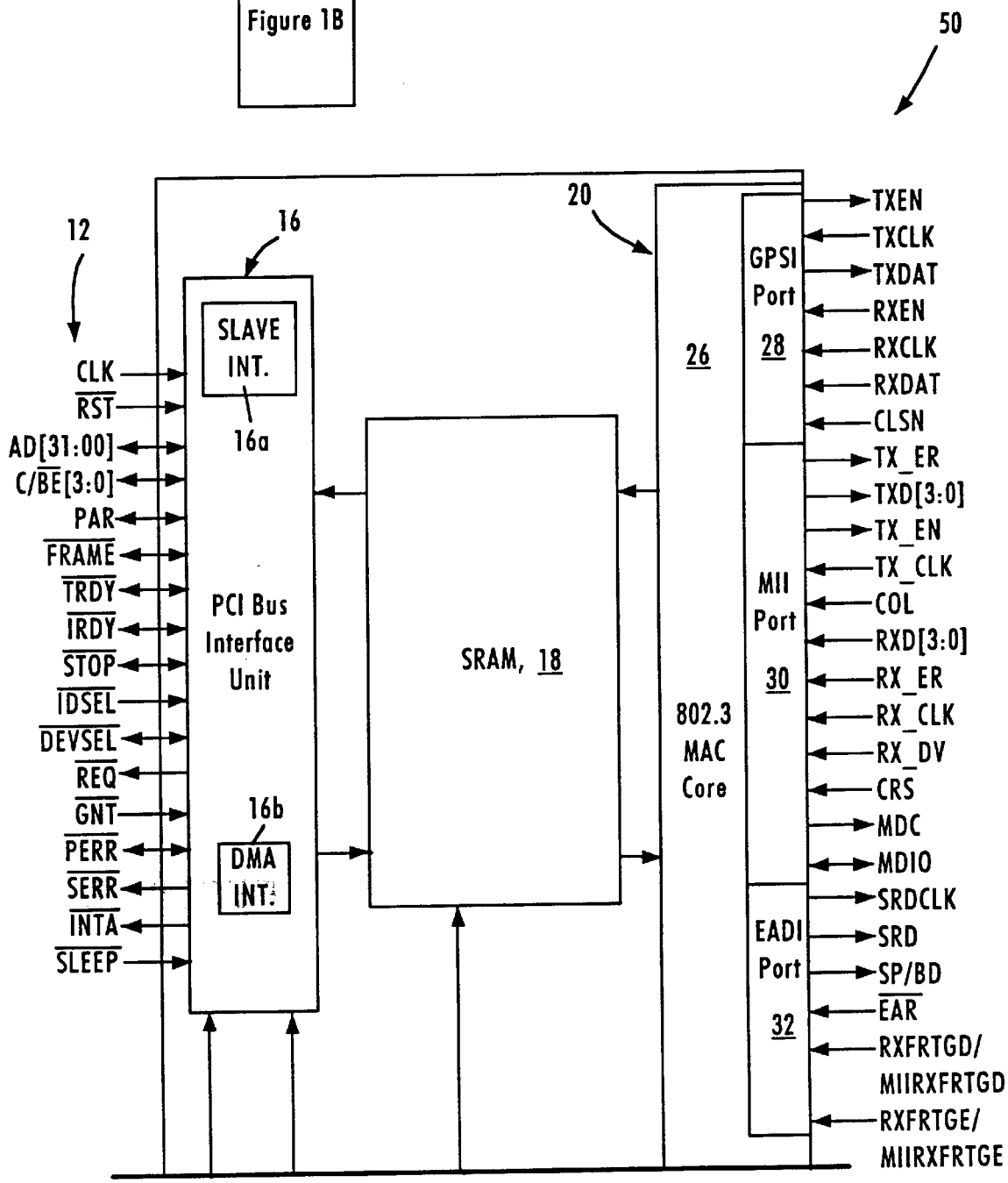
Figure 1B:
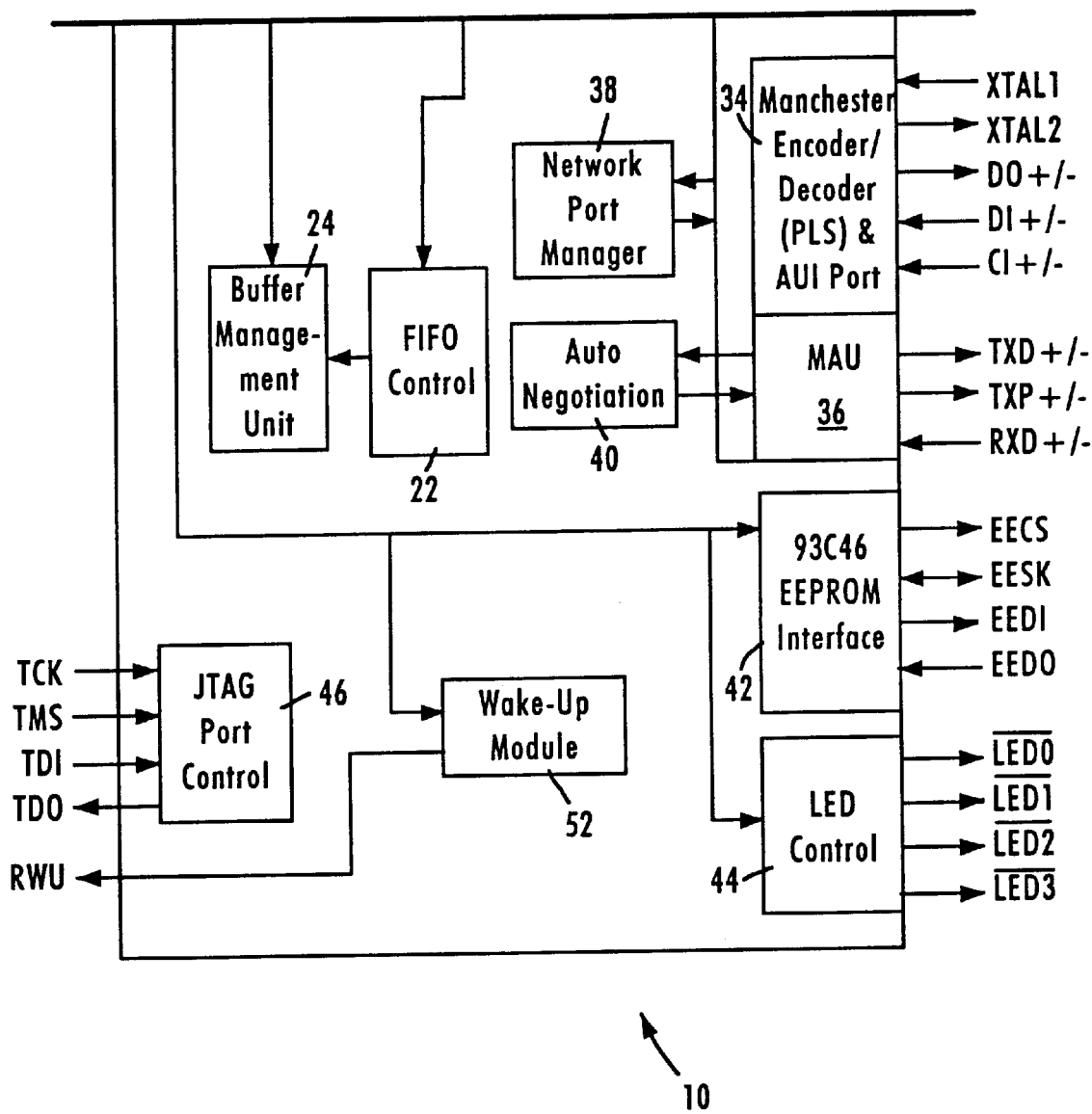

Column 3, line 5, delete "FIG. 1 is" and insert --FIGS. 1, 1A and 1B are--.

Signed and Sealed this

Twenty-seventh Day of June, 2000

*Attest:*

Q. TODD DICKINSON

*Attesting Officer*    *Director of Patents and Trademarks*